Sept. 22, 1931.                M. BOWER                 1,823,929
                             WATT HOUR METER
                            Filed May 14, 1930
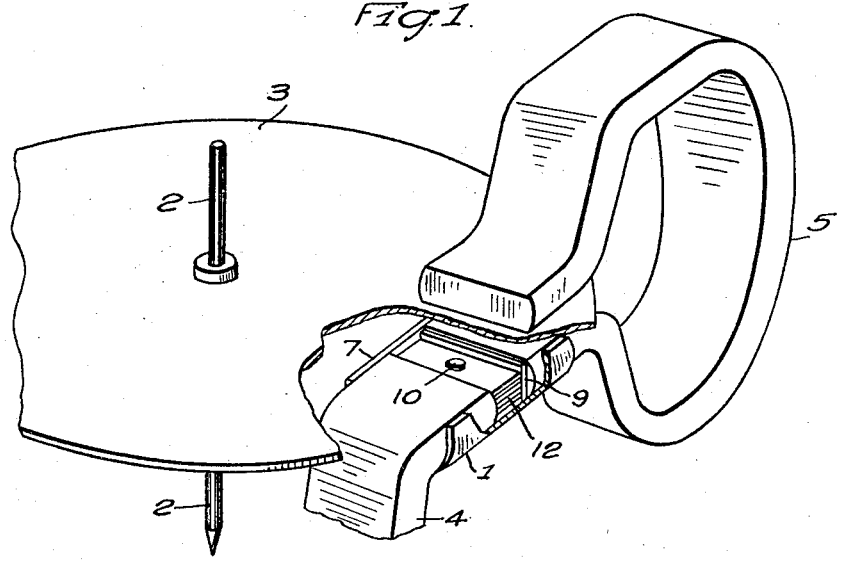
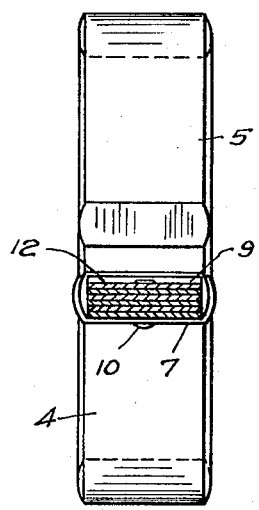
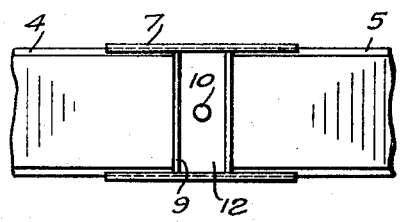
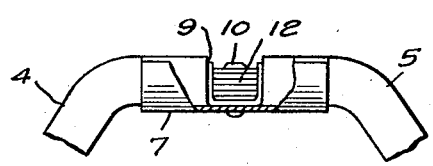
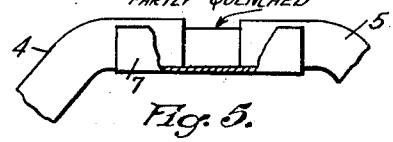
INVENTOR
Maxwell Bower.
BY
ATTORNEY Patented Sept. 22, 1931

1,823,929

UNITED STATES PATENT OFFICE

MAXWELL BOWER, OF CAMBRIDGE, MASSACHUSETTS, ASSIGNOR TO WESTINGHOUSE ELECTRIC & MANUFACTURING COMPANY, A CORPORATION OF PENNSYLVANIA

WATT-HOUR METER

Application filed May 14, 1930. Serial No. 452,231.

My invention relates to temperature compensation and particularly to means for compensating for the effects of temperature variations in the operation of watt-hour meters.

The effect of temperature variations on the accuracy of electrical instruments has long been recognized as an undesirable feature, and many expedients have been adopted to compensate the instruments for it. The problem is of particular importance in connection with meters and instruments of the induction-disc type, wherein a rotating flux is set up in a rotatable disc by an electromagnet, usually termed a driving magnet, which is energized in accordance with the magnitude of a quantity to be measured. In addition, a permanent magnet is usually associated with the disc to damp the movement thereof, and, although this magnet is usually of substantially C-shape, so that a portion of the disc may rotate between the adjacent ends thereof, it obviously may be of other shapes and associated with the disc in other relations.

Obviously, changes in temperature in such a meter, affect the permeability of the electromagnet, and hence, the driving flux, and affect the resistance of the disc, and the damping torque exerted by the permanent magnet. These effects may or may not be cumulative, depending upon the temperature coefficient of permeability of the materials employed, but, in the case of a watt-hour meter of present-day design, used for metering domestic and commercial power loads, it is well established that a rise in temperature will cause an increase in the operating speed of the meter, and, conversely, a decrease in temperature will result in a decrease in the meter registration.

The total error of the meter, introduced by variations in temperature, may be corrected by varying either the driving flux or the damping flux in accordance with the temperature variation but the usual expedient has been to employ a metallic shunt, of a material having a negative temperature coefficient of permeability, associated with the damping magnet to control the magnitude of the flux thereof which is effective to damp the movement of the disc.

With such construction, an increase in temperature, which normally would cause an increase in the registration of the meter, will decrease the permeability of the magnet-shunt and thereby cause an increased damping flux to maintain the registration substantially constant.

In view of the wide range in temperature variation encountered, from summer to winter temperatures, at various latitudes, it is apparent that the shunt employed must have a constant rate of change of permeability with temperature variation over a very wide range of temperatures. Since no single shunt material is known which has this property to a sufficient degree for present commercial requirements, it has been the practice to employ a shunt comprising at least two elements of different alloy composition, each of which is capable of compensating the meter over a portion of the temperature range encountered, so that the total effect of the two alloys is to compensate over the entire temperature range.

The use of two alloys has advantages in such shunts, over the results heretofore obtained by the use of a single alloy, but has the disadvantages of requiring different materials to be carried in stock, entailing the fabricating and matching of the component shunt elements and of not providing the simple and economical structure of a single-alloy shunt.

One object of my invention is to provide a shunt element that shall have portions of the same composition and different flux-temperature characteristics.

Another object of my invention is to preclude the necessity for providing a magnetic shunt of materials or alloys of different composition to compensate for temperature effects on the magnetic systems, of watt-hour meters and other devices.

It is my aim to obtain the advantages of a double-alloy shunt, without its disadvantages, and, accordingly, in practicing my invention, I provide a single-alloy shunt of such character, or that has been so treated, as to attain my purposes.

Figure 1 of the accompanying drawings is a perspective view of a portion of a watt-hour meter embodying my invention, Fig. 2 is an elevational view of a portion of the device shown in Fig. 1, Fig. 3 is a top-plan view of a portion of the structure shown in Figs. 1 and 2, Fig. 4 is a side view of the structure shown in Fig. 3, parts being broken away, and Fig. 5 is a view, similar to Fig. 4, of a modified form of the invention.

The structure of watt-hour meters of present-day design is well known to those versed in the art, and, therefore, only the parts necessary to a full and complete understanding of the invention are shown, namely, a meter spindle 2, an armature disc 3 and permanent damping magnets 4 and 5. It is to be understood that an electromagnet having current and voltage windings is associated with the disc in accordance with usual practice.

The disc 3 is adapted to be rotated by the electromagnet and, in turn, to rotate the spindle 2 to operate an indicating element, a gear train, register or other device; the magnets 4 and 5 being provided to suitably damp or control the movement of the disc.

A suitable support 7, such as a channel member of non-magnetic sheet material, embraces the under and side surfaces of the lower adjacent pole-portion of the magnets 4 and 5, and bridges the gap between the pole ends. The side surfaces are slightly curved, so that the member 7 is maintained in position by its interfitting relation thereto, and preferably, is crimped in position.

A second channel member 9 of non-magnetic material disposed between, and extending transversely to, the pole ends, is suitably secured to the channel member 7, as by a rivet 10 which also extends through a laminated shunt element 12 disposed in the second channel member 9.

The shunt element 12 is constructed of any desired number of laminations of magnetic material, of the same alloy composition, having a negative temperature coefficient of permeability; a suitable composition consisting, in general, of from 60% to 80% nickel, ½% to 4% manganese, ½% to 3% iron and the remainder copper. It is essential that silicon be limited to a trace. I have found that, for my purposes, an alloy containing about 70% nickel, 3.5% manganese, 1.2% iron and the remainder copper is suitable.

This material, when annealed, has a magnetic release point, or point of magnetic transformation, at approximately 50° C.; the rate of change of permeability between 15° and 50° C. being substantially uniform.

By heating this alloy to approximately 1100° F. and quenching in water, the magnetic release point is lowered to about 17° C. Below 17° C. the quenched material has a substantially uniform rate of change of permeability.

By combining two or more elements or laminations of this alloy, as in the shunt 12, one or more of which have been annealed and the other or others quenched, a shunt may be obtained having the characteristics of a shunt containing dissimilar alloys. Also, by including elements which have been either annealed or quenched, a shunt of a wide variety of characteristics may be obtained. In other words, a shunt may be constructed of alternately disposed annealed and quenched laminations, of one annealed element, and then two quenched elements, or of any combination which the kind and number of elements will permit. Further, in any of the possible combinations, the relative sizes and shapes of the component parts may be as desired.

Also, as shown in Fig. 5, a single piece of the alloy material may have one portion annealed and another portion quenched, and may be used alone or in combination with the elements mentioned above.

It will be apparent that a composite element, as above described, will compensate the meter over any temperature range which may be encountered. I have found that, if the shunt is formed of two elements, one of which has been annealed and the other heated to 1100° F. and quenched in water, the rate of change of permeability of the shunt as a whole, with temperature, is substantially linear from −20° C. to 50° C.; and this range of compensation is amply sufficient to meet present commercial requirements.

Also, it is usual for meter manufacturers to purchase shunt material from alloy mills, and, although the composition of the alloy ordered is carefully specified, variations in the composition inevitably occur and adversely affect the performance of the shunt. In accordance with the present invention, however, inaccuracies and variations in the alloy composition, within certain limits, of course, will be corrected by the annealing and heat-treating operations, so that shunts made from different batches of the alloy will have substantially the same characteristics, and, therefore, will have a substantially standard effect in compensating the meters for temperature variations.

Since various changes and modifications may be made in the above described apparatus without departing from the spirit of the invention, I desire that the scope of the invention shall be limited only by the prior art and by the appended claims.

I claim as my invention:

1. In combination with an electrical instrument including a rotatable armature and a permanent magnet associated therewith to damp the movement thereof, of a shunt element associated with said magnet to vary the effective damping flux thereof in accordance with variations in temperature, said shunt comprising at least two elements of substantially the same alloy composition, one of which has a magnetic transformation point at approximately 50° C. and the other at approximately 17° C.

2. Means in a magnetic circuit for compensating for the effect of temperature changes comprising a magnetic shunt including portions of the same alloy composition having different magnetic release or transformation points.

3. Means in a magnetic circuit for compensating for the effect of temperature changes including a magnetic shunt comprising differently heat-treated portions of substantially the same alloy composition.

4. Means for controlling a magnetic-flux circuit embodying magnetic members spaced to provide a gap comprising a shunt element bridging said gap and including differently-heat-treated portions of the same alloy composition.

5. Means for controlling a flux circuit including elements spaced to provide a gap, a magnetic-alloy shunt disposed in said gap and including a quenched portion and an annealed portion of the same alloy composition.

6. In combination with an electrical instrument subject to errors caused by temperature variation and means embodied in said instrument constituting a magnetic-flux path for controlling the operation thereof, of means for controlling the permeability of said flux path comprising a shunt element composed of at least two elements of the same alloy composition having different magnetic transformation points.

7. In combination, means providing a magnetic-flux circuit including a gap, and means controlling the flux in said circuit comprising an element in shunt to said gap including portions of substantially the same alloy composition having different flux-affecting characteristics.

In testimony whereof, I have hereunto subscribed my name this 3rd day of May, 1930.

MAXWELL BOWER.